Dec. 23, 1941.  E. H. NILSON  2,267,417
SUPPORT FOR CYLINDRICAL VESSELS
Filed Aug. 5, 1938  2 Sheets-Sheet 1
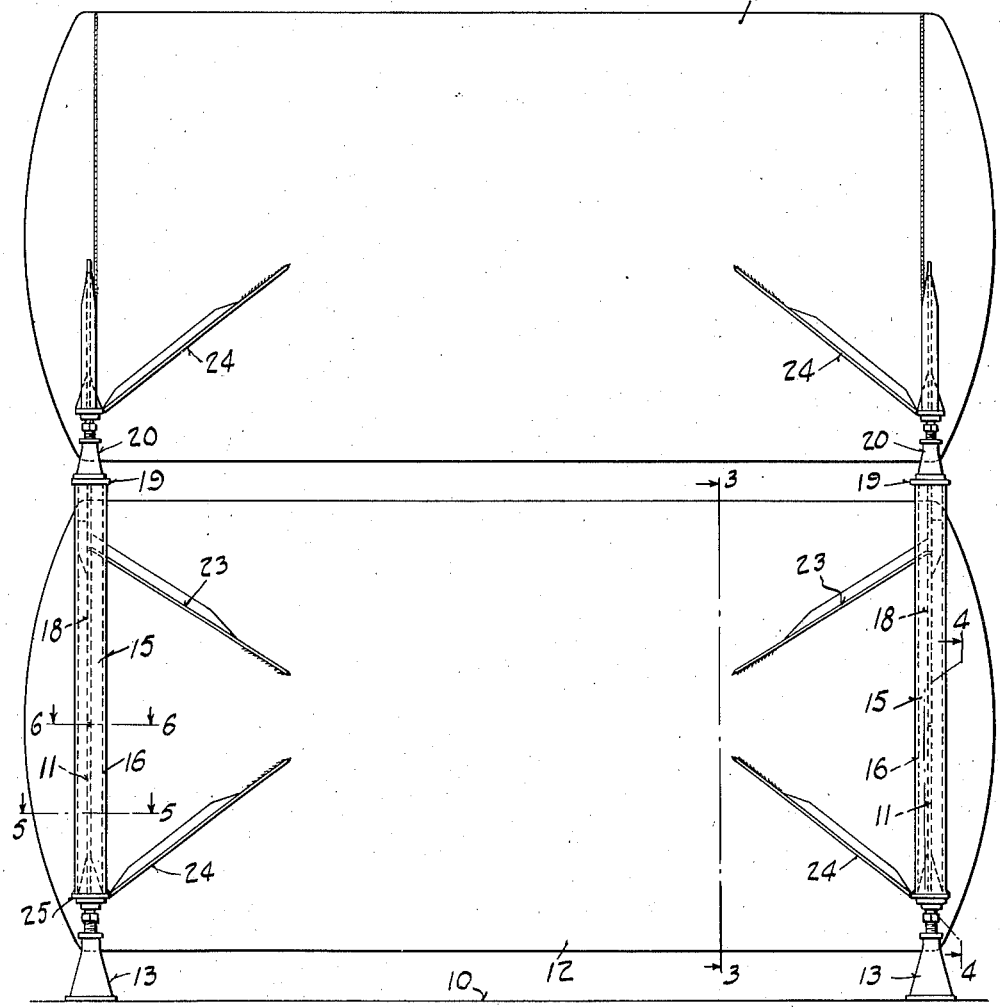
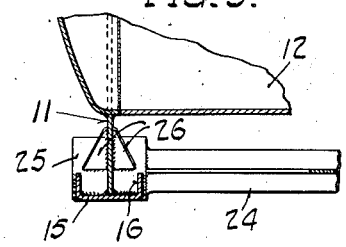
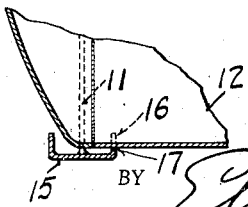
Eric H. Nilson
INVENTOR.
ATTORNEY.

Dec. 23, 1941.  E. H. NILSON  2,267,417
SUPPORT FOR CYLINDRICAL VESSELS
Filed Aug. 5, 1938  2 Sheets-Sheet 2
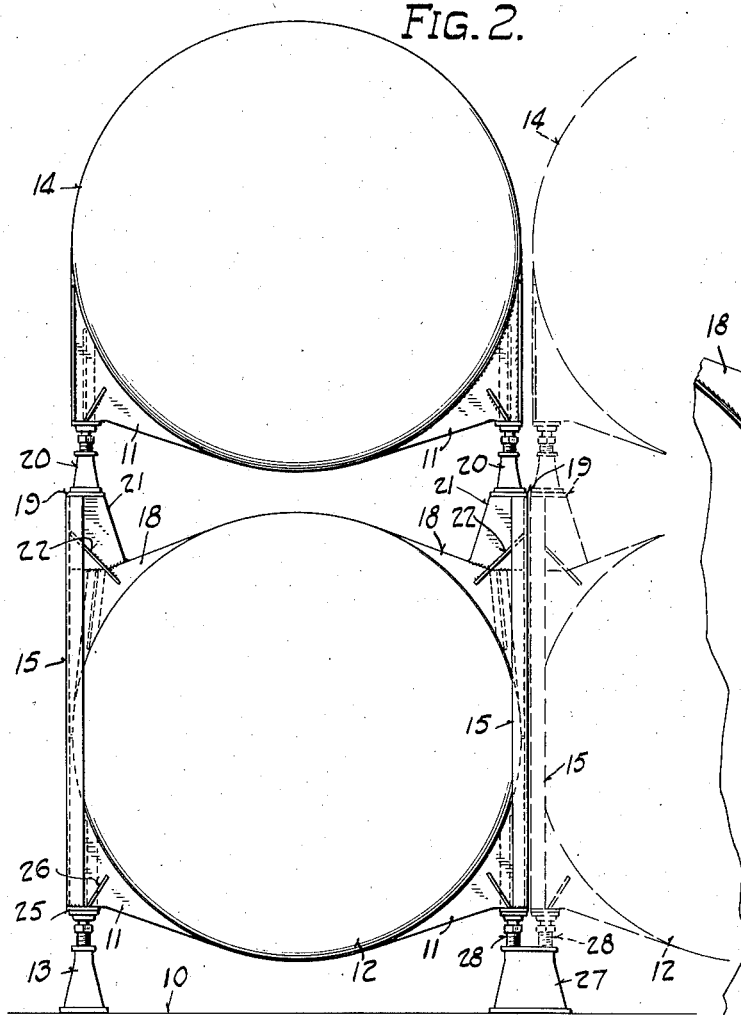
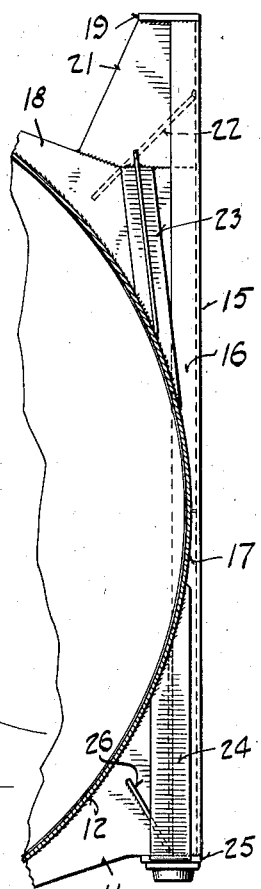
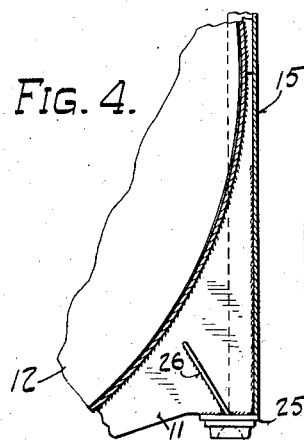
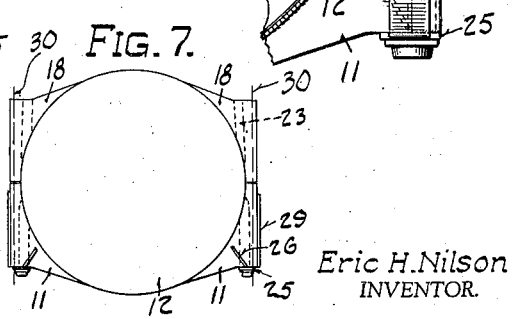
Eric H. Nilson
INVENTOR.
BY
ATTORNEY.

Patented Dec. 23, 1941

2,267,417

UNITED STATES PATENT OFFICE 2,267,417

SUPPORT FOR CYLINDRICAL VESSELS

Eric H. Nilson, Milwaukee, Wis., assignor to A. O. Smith Corporation, Milwaukee, Wis., a corporation of New York Application August 5, 1938, Serial No. 223,138

2 Claims. (Cl. 220—9)

This invention relates to supports for cylindrical vessels and is particularly adapted for vessels used for storage and aging of beer. Vessels for this purpose are fabricated from steel plates and are frequently of dimensions in excess of 11 feet in diameter and 40 feet in length with wall thickness as low as ¼ inch. Vitreous enamel in many instances is applied to the inside surface of such vessels to protect the beer from contact with the metal.

Vessels of this nature are disclosed in United States Letters Patent No. 2,092,165 issued to William R. Kepler September 7, 1937, and in co-pending application Serial No. 179,055 of Eric H. Nilson and Fritz A. Carstens for Supporting brackets for cylindrical vessels, now matured into Patent No. 2,167,000.

In use the vessels are housed in storage buildings and are positioned as closely as practical to economize in floor space. A preferred method is to mount them horizontally in vertically disposed pairs arranged side by side upon the floor or other suitable supporting base in the building.

The invention resides principally in simple and efficient supports for mounting vessels in this way and in the method of attaching said supports to the vessels.

An object of the invention is to support one vessel above another upon common supports without excessive deflection or strain in the walls of the vessels.

A further object is to provide supports which permit close positioning of adjacent pairs of vessels.

Other objects will become apparent upon reference to the specification and accompanying drawings.

In the drawings:

Figure 1 is a side elevational view of a pair of vessels mounted in accordance with the invention;

Fig. 2 is an end elevational view of the vessels shown in Fig. 1, a portion of an adjacent pair, indicated by broken lines, being closely positioned thereto;

Fig. 3 is a sectional view of a portion of the lower vessel showing a support for the upper vessel, section taken on the line 3—3 of Fig. 1;

Fig. 4 is a fragmentary sectional view taken on the line 4—4 of Fig. 1;

Fig. 5 is a similar view taken on the line 5—5 of Fig. 1;

Fig. 6 is a similar view taken on the line 6—6 of Fig. 1; and

Fig. 7 is an end elevational view of reduced scale of the lower vessel preparatory to firing the vitreous enamel lining.

Referring to the drawings, two cylindrical vessels are shown horizontally disposed one above the other and supported upon a floor or other suitable support 10.

The vessels are enamel lined and have supporting fins 11 edge welded to their lower halves, a pair at each head, as disclosed in the co-pending application above referred to.

The lower vessel 12 is supported upon stands 13 one at the outer lower edge of each fin. To support the upper vessel 14 upon these same stands, a pair of vertical channel iron posts 15 are disposed at each head and straddle the fins 11 to which they are welded along the medial line of their webs as shown in Fig. 5.

To reduce the overall width of the supports to a minimum the inner flange 16 of each post 15 is cut away at 17, as shown in Figs. 3 and 6, so that the posts may be set closer to the vessel. In a battery of ten pairs of vessels this construction will reduce their total width by as much as forty inches.

To reenforce and brace the upper end of each post 15 a fin 18, similar to the fin 11, is edge welded to the upper half of the vessel in vertical alignment with the fin 11. The fin 18 is also edge welded to the web of the post along the medial line thereof. The post extends a short distance above the fin 18 and is capped with a plate 19 which provides a base for the stand 20 of the upper vessel 14. A gusset plate 21 is edge welded to the fin 18, post 15 and cap plate 19 to reenforce the structure. A brace 22 extends diagonally across the fin 18 and gusset plate 21 and is welded thereto and to the post 15. A brace plate 23 is welded to the upper edge of fin 18 and extends diagonally downward and engages the vessel wall along a curved portion to which it is welded.

Braces 23 function similarly to the lower braces 24 which are disclosed in the co-pending application referred to.

The vessel 12 is provided with the usual foot plates 25, welded to the outer lower edge of each fin 11, and with braces 26 welded to each fin 11 and plate 25. The posts 15 bear upon the foot plates and are welded thereto.

When adjacent pairs of vessels are closely positioned, as shown in Fig. 2, a stand 27 is preferably employed to support the vessels at each end of their opposed sides. This stand is provided with two leveling screws 28 and is more stable and permits closer mounting of the vessels than two single screw stands 13.

In order to facilitate the firing of the vitreous enamel lining, the vessel, as shown in Fig. 7, is provided only with those attachments which support it during firing and those which are directly welded to it and which could not be secured thereto after the firing of the enamel without injury to said enamel. These attachments include the upper fins 18 and brace plates 23 and the lower supporting brackets each of which comprises fin 11, foot plate 25, braces 26 and a temporary stiffening flange 29. The fins 11 and 18 are slightly wider than finally required so as to allow for vertically aligning their outer edges, after the firing operation, preparatory for welding the post 15 thereto. This vertical alignment is along the dotted line 30, Fig. 7, and removes the flange 29 which is no longer required.

The posts 15, gussets 21, plates 19 and braces 22 are then welded into place, these welding operations being sufficiently removed from the vessel wall as not to injure the vitreous enamel lining.

Various embodiments of the invention may be employed without departing from the spirit and scope of the invention as defined in the following claims.

I claim:

1. Supporting means for vitreous enamel-lined thin-walled vessels of horizontal cylindrical construction arranged one above the other in parallel alignment, comprising a pair of brackets at each head disposed at opposite sides of the lower half of each vessel, a pair of reenforcing fins welded at each head to the upper half of the lower vessel, a pair of vertical channel shaped posts at each head of the lower vessel for supporting the upper vessel, the flanges being inturned and the inner flange of each channel being cut away to permit the post to be set close to the vessel to reduce the overall width of the structure, the outer flange of each channel passing upwardly adjacent the outer surface of the respective head and the web of each channel being welded to a bracket and vertically aligned fin of the lower vessel, and a stand for each bracket of the lower vessel and its corresponding post to support the structure upon a base.

2. Supporting means for vitreous enamel-lined thin-walled vessels of horizontal cylindrical construction arranged one above the other in parallel alignment and having relatively stiff heads welded to the ends of the cylindrical body, comprising a pair of brackets at each head on opposite sides of the lower half of the lower vessel for supporting the same, a similar set of brackets on the upper half of said lower vessel and disposed above said lower brackets, said brackets being welded to the vessel wall on a circumferential line near the curvature of the knuckle radius between the respective head and vessel body, and a pair of vertical posts at each head of the lower vessel extending upwardly from the lower pair of brackets to the upper brackets of the lower vessel and welded thereto to support the upper vessel thereon, said posts having parts cut away to permit the posts to be set close to the vessel to reduce the over all width of the structure and being adjacent to and overlapping the welded seam between the bracket and the vessel wall.

ERIC H. NILSON.